Oct. 10, 1939.                H. R. ROSENBERRY                2,175,318
                              PLATE FASTENING DEVICE
                              Filed Aug. 27, 1938

INVENTOR
HOMER R. ROSENBERRY
BY
ATTORNEY

Patented Oct. 10, 1939

2,175,318

UNITED STATES PATENT OFFICE 2,175,318

PLATE FASTENING DEVICE

Homer R. Rosenberry, Euclid, Ohio, assignor to The Cleveland Pneumatic Tool Company, Cleveland, Ohio, a corporation of Ohio Application August 27, 1938, Serial No. 227,130

3 Claims. (Cl. 85—5)

This invention relates broadly to devices for provisionally securing together perforated plate-like elements with their perforations in vertical alignment preparatory to the riveting thereof.

One object of the invention is to produce improvements in the plate fastening device described and claimed in the copending applications Serial No. 65,439 filed February 24, 1936, and Serial No. 120,350 filed January 13, 1937.

Another object of this invention is to provide such device with means for preventing the plates from being marred or dented by the device when in operative engagement with the plates.

Another object of this invention is to produce a device for securing plates or like articles together, preparatory to the riveting thereof, which is simple in construction, relatively cheap to manufacture and affording a compact assembly which is strong, durable, and efficient.

Other objects and features of this invention will appear more clearly from the following description and drawing of which:

Figure 1:
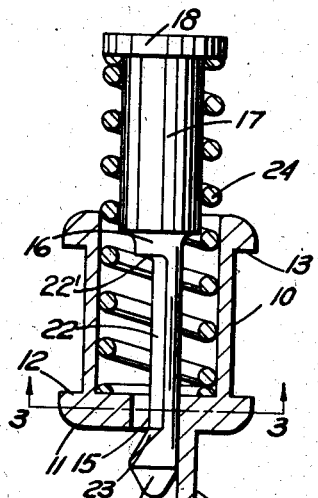
Fig. 1 is a longitudinal sectional view of the device shown in the process of assembly.
Figure 2:
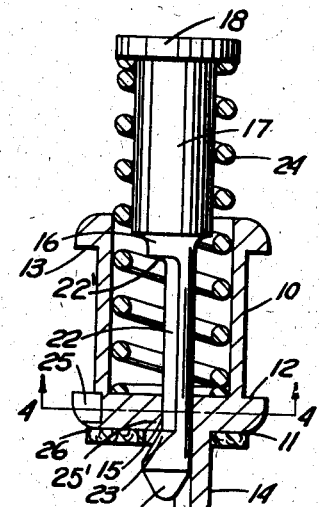
Fig. 2 is a view similar to Fig. 1, showing the device completely assembled.
Figure 3:
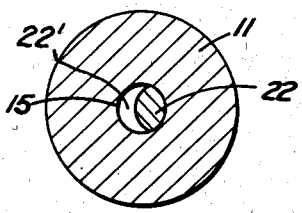
Fig. 3 is a cross sectional view taken in a plane indicated by the line 3—3 of Fig. 1.

Referring to the drawing, 10 represents a cup-shaped housing having the bottom wall 11 thereof forming an external annular flange 12, while the upper end of the housing is provided with a similar flange 13. Depending from the bottom wall 11, there is a stem 14 eccentrically disposed relative to the center axis of the housing and of crescent-shape cross section resulting from the drilling of a central bore or orifice 15, through the bottom wall 11.

Slidable within the housing 10, there is a pin 16 formed with an upper enlargement 17 terminated by a head or annular seat 18. The normal diameter of the pin 16 is preferably substantially equal to that of the drilled bore 15 and to that of the rivet perforations or rivet holes 19 formed through the work, which work is represented on the drawing as two superposed plates 20. The free end of the pin is pointed as at 21 for facilitating the insertion of the pin through the perforations 20.

Figure 7:
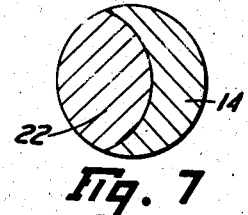
Fig. 7 is an enlarged cross sectional view taken in a plane indicated by line 7—7 in Fig. 5.

Intermediate its ends the pin 16 is machined into a reduced portion 22 of a substantially oval shape cross section which cooperates with the crescent shaped cross section of the stem 14 to form therewith a circular cross section shown in Fig. 7, which cross-section is of a diameter substantially equal to that of the rivet holes 19. This reduced portion 22 is terminated by a step 22' and by a step or lateral projection 23, the purpose of which will be explained later.

The housing 10 is of adequate size to accommodate a compression spring 24 surrounding the pin and having one end resting on the bottom wall 11 of the housing 10, which wall forms an uninterrupted seat for the spring, while the other end is seated on the annular seat 18 of the pin 16. The spring 24 is also designed to fit closely on the enlargement 17 of the pin 16 and within the housing 10, thereby acting as a guiding bushing for the pin for preventing lateral movement of the pin relative to the housing.

Figure 4:
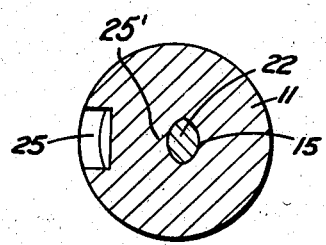
Fig. 4 is a cross sectional view taken in a plane indicated by the line 4—4 in Fig. 2.

After the pin 16 and the spring 24 have been assembled in the housing 11 as shown in Fig. 1, the flange 12 together with the bottom wall of the housing is laterally instruck as at 25 for closing the bore 15 around the pin's reduced portion 22 as shown in Fig. 4, thereby changing the circular cross sectional shape of the bore 15 into a substantially oval shape, and providing a stop 25' engageable by the projection 23 of the pin 16 for preventing the removal of the pin from the housing 10.

Preferably glued on or otherwise affixed to the bottom wall 11 of the housing 10, there is a buffer or washer 26, the center hole of which is large enough to enable engagement of the projection 23 with the stop 25'. In practice this buffer may be made of either rubber, cork, felt, leather, or other similar material intended to protect the work from being marred or dented by the housing while in operative engagement therewith as hereinafter explained.

Figure 5:
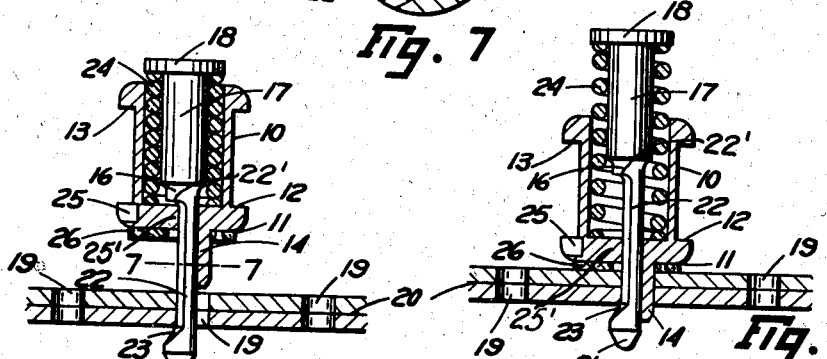
Fig. 5 is a view similar to Fig. 2 showing the device in the position assumed when applied to the work.
Figure 6:
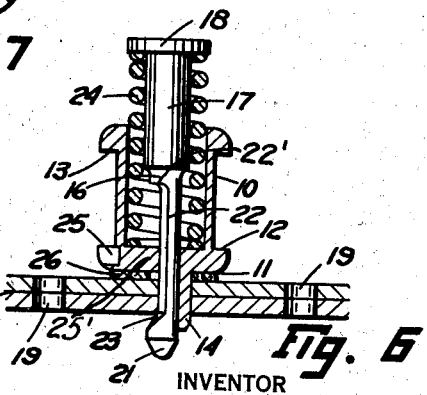
Fig. 6 is a view of the device in operative position.

In the operation, the device is applied to the work by first positioning the pin within the housing 10, as shown in Fig. 5. To that end, pressure by means of a plier like tool is applied in opposite directions on the annular flange 13 of the housing 10 and on the head 18 of the pin 16, thereby compressing the spring 24 and causing the shoulder 23 of the pin 16 to protrude beyond the free end of the stem 14 a distance somewhat greater than the combined thickness of the plates 20. This outward slidable movement of the pin is limited by the engagement of the step 22' with the stop 25'. Thereafter the protruding portion of the pin is inserted through the perforations 20 and moved laterally to bring the stem 14 into alignment with the perforations. By releasing the pressure previously applied on the flange 13 and the head 18, the compression spring will act on the pin and cause clamping of the plates between the bottom wall 11, or its component buffer 26, and the projection 23 of the pin 16. Due to the circular cross section formed by the stem 14 and the reduced portion 22 of the pin 16, which cross-section is of a diameter substantially equal to that of the perforations 19, the upper and lower plates 20 will provisionally be held together with their perforations in perfect coaxial alignment for receiving the rivets intended to permanently secure the plates together.

To remove the device, pressure is again applied on the housing 10 and pin 16 in the manner above referred to, thereby compressing the spring 24 and enabling removal of the device from the work.

From the foregoing it will be understood that due to the buffer 26 being secured to the lower side of the bottom wall 11, direct contact of the housing with the work is prevented, thereby overcoming the difficulty heretofore encountered with this type of device wherein the housing due to the pressure of the spring acting thereon was found to mar or dent the work. In practice where the device is used with relatively thin aluminum plates or the like, the marring of the work was objectionable not only from a matter of appearance but because the detents resulting from the pressure of the housing on the work was found to create abnormal stresses leading to crystallization and often breakage of the plates.

By providing the bottom wall with an oval shaped bore equal in cross section to the cross section of the reduced portion of the pin, which bore, it has been explained, is obtained by the flange 12 being instruck, a simple and effective lock is provided for preventing accidental removal of the pin from the housing.

Although the foregoing description is necessarily of a detailed character, in order to completely set forth the invention, it is to be understood that the specific terminology is not intended to be restrictive or confining and it is to be further understood that various rearrangements of parts and modification of structural detail may be resorted to without departing from the scope or spirit of the invention as herein claimed.

I claim:

1. A removable rivet for provisionally securing at least two superposed perforated plates together, comprising a substantially cup-shaped housing, a bore through the bottom of said housing formed with a rigid inner wall relative to the housing, a pin slidable within said housing, a reduced portion intermediate the ends of said pin slidable through said bore in guided engagement with the inner wall thereof, a lateral projection on said pin engageable with said housing for limiting slidable movement of said pin in one direction, said projection being insertable through the perforation of the plates for engagement with the underside of the under plate, a stem depending from said housing partly surrounding said pin to form with the reduced portion thereof a circular cross-section, said stem being insertable into said perforations to cooperate with the reduced portion of said pin for maintaining said perforations in coaxial alignment, a seat within said housing contacting the periphery of the reduced portion of said pin, a seat on said pin, and a compression spring operatively engaging said seats for effecting the clamping of the plates between said housing and the projection on said pin.

2. A removable rivet for provisionally securing at least two superposed perforated plates together, comprising a substantially cup-shaped housing having a bore through the bottom thereof of oval-shaped cross section, a laterally instruck portion within the bottom wall of said housing forming a part of the inner wall of said bore, a pin slidable within said housing formed with a reduced portion slidable through said bore in guided engagement with the inner wall thereof against rotation relative to said housing, a lateral projection on said pin engageable with said instruck portion for limiting slidable movement of said pin in one direction, said projection being insertable through the perforation of the plates for engagement with the underside of the under plate, a stem depending from said housing partly surrounding said pin, said stem being insertable into said perforations to cooperate with the reduced portion of said pin for maintaining said perforations in coaxial alignment, a seat within said housing and on said pin, and a compression spring operatively engaging said seats for effecting the clamping of said plates between said housing and the projection on said pin.

3. A removable rivet for provisionally securing at least two superposed perforated plates together, comprising a substantially cup-shaped housing, a bore through the bottom of said housing, a reduced portion intermediate the ends of said pin slidable through said bore, a lateral projection on said pin, a laterally instruck portion on said housing extending into said bore to form a portion of the inner wall thereof, said instruck portion being engageable by said projection for limiting slidable movement of said pin in one direction, a stem depending from said housing partly surrounding said pin, said stem being insertable into said perforations to cooperate with the reduced portion of said pin for maintaining said perforations in coaxial alignment, and a compression spring within said housing acting on said pin for effecting clamping of said plates between said housing and projection.

HOMER R. ROSENBERRY.